United States Patent

[11] 3,585,613

[72] Inventor Thomas L. Palfi
Yorktown Heights, N.Y.
[21] Appl. No. 853,353
[22] Filed Aug. 27, 1969
[45] Patented June 15, 1971
[73] Assignee International Business Machines Corporation
Armonk, N.Y.

[54] FIELD EFFECT TRANSISTOR CAPACITOR STORAGE CELL
7 Claims, 4 Drawing Figs.

[52] U.S. Cl. .......... 340/173
[51] Int. Cl. .......... G11c 11/40, G11c 7/00, G11c 5/02
[50] Field of Search .......... 340/173; 307/238, 279; 317/235

[56] References Cited

UNITED STATES PATENTS

| | | | |
|---|---|---|---|
| 3,322,974 | 5/1967 | Ahrons et al. | 307/279 |
| 3,365,707 | 1/1968 | Mayhew | 340/173 |
| 3,373,295 | 3/1968 | Lambert | 340/173 X |
| 3,506,851 | 4/1970 | Polkinghorn et al. | 340/173 X |
| 3,510,849 | 5/1970 | Igarashi | 340/173 |
| 3,518,635 | 6/1970 | Cole et al. | 340/173 |
| 3,395,292 | 7/1968 | Bogert | 307/279 X |
| 3,387,286 | 6/1968 | Dennard | 340/173 |

*Primary Examiner*—Stanley M. Urynowicz, Jr.
*Attorneys*—Hanifin and Jancin and Victor Siber ABSTRACT: A nondestructive read integrated circuit memory having a two-dimensional array of insulated-gate field-effect transistor cells. Each cell consists of three transistors, an input isolation transistor, an output isolation transistor and a storage transistor. The cells in the array are interconnected along one dimension by bit sense lines and along a second dimension by 1 and 2 control lines. Only the cells which are selected by the control lines are operative during a read or write cycle, and the remaining cells are isolated from the active cells by means of the unactivated input and output isolation transistors. The input isolation transistor, when activated during a write cycle controls the placement of a charge which represents storage information across the gate to substrate capacitance of the storage transistor. The output isolation transistor, when activated during a read cycle controls the sensing of information stored at the storage transistor.

INVENTOR
THOMAS L. PALFI

BY Robert J Haase
ATTORNEY

FIELD EFFECT TRANSISTOR CAPACITOR STORAGE CELL

BACKGROUND OF THE INVENTION

The present invention relates to a two-dimensional memory array in an integrated circuit structure. More particularly, it relates to an integrated circuit consisting of a plurality of insulated-gate field-effect transistors.

In the present state of the art, it is well known that the field effect transistors may be used in memory units. Furthermore, it is also known to use IGFET (insulated-gate field-effect transistors) of storing information in various circuit arrangements such as shift registers.

One approach in the prior art in the use of EGFET's for storage devices, has been to arrange the field effect transistors in a flip-flop or latch arrangement. Structures having a latch arrangement necessitate a large number of active devices in each cell and therefore require a relatively large area on the integrated circuit substrate. This type of design limits the number of memory cells which can be built on a single substrate.

A different approach from the latch type of design, was disclosed in U.S. Pat. No. 3,387,286, issued June 4, 1968. In this patent, there is disclosed a memory array of field effect devices arranged so as to form cells each having two IGFET's Each cell in this array is capable of storing signal information by maintaining a charge across the capacitance between the gate and the substrate of one of the transistors. While this device requires only a minimum of two field-effect devices it is found that the circuit still requires a relatively large area at each cell location. A further disadvantage with the two field-effect device is that the sensing of output information from the memory cells causes a disturbance on the remaining cells connected along the sense line. This is caused by the fact that each storage FET acts as a load on the sense line because they are directly connected to the sense line without any means of isolation. Thus, in these types of memory units it is difficult to maintain high reliability of stored information without introducing error during a sense cycle.

Therefore, it is an object of the present invention to provide an improved integrated circuit memory device.

It is a further object of the present invention to increase the density and reduce the cost per cell of an integrated circuit two-dimensional insulated-gate field-effect transistor memory cell array.

Another object of the present invention is to isolate the memory cells during a read and write operation of an insulated-gate field-effect transistor memory integrated circuit.

SUMMARY OF THE INVENTION

In the present invention a two-dimensional array is provided in an integrated circuit structure in which each cell requires three insulated-gate field-effect transistors. The circuit arrangement of the three transistors in the cell allow for signal information to be stored in one of the transistors by placing a charge across the capacitance that exists between the gate and source region of the transistor.

The particular circuit arrangement within each cell provides for a minimum amount of physical area by the particular symmetry of the field-effect transistors that are formed in the substrate. This reduction of size provides a greater density of cells in the integrated circuit array thus reducing the overall cost per cell in the memory. Each cell consists of an input and an output transistor connected to the storage transistor. The input and output transistors provide the necessary isolation of the storage element from the bit sense line that interconnects the cells of the memory array. The input transistor controls the placement of a charge across the gate to substrate or source capacitance during a write cycle while the output transistor controls the sensing of the storage transistor controls the sensing of the storage transistor during a read cycle.

DESCRIPTION OF THE INVENTION

Figure 1:
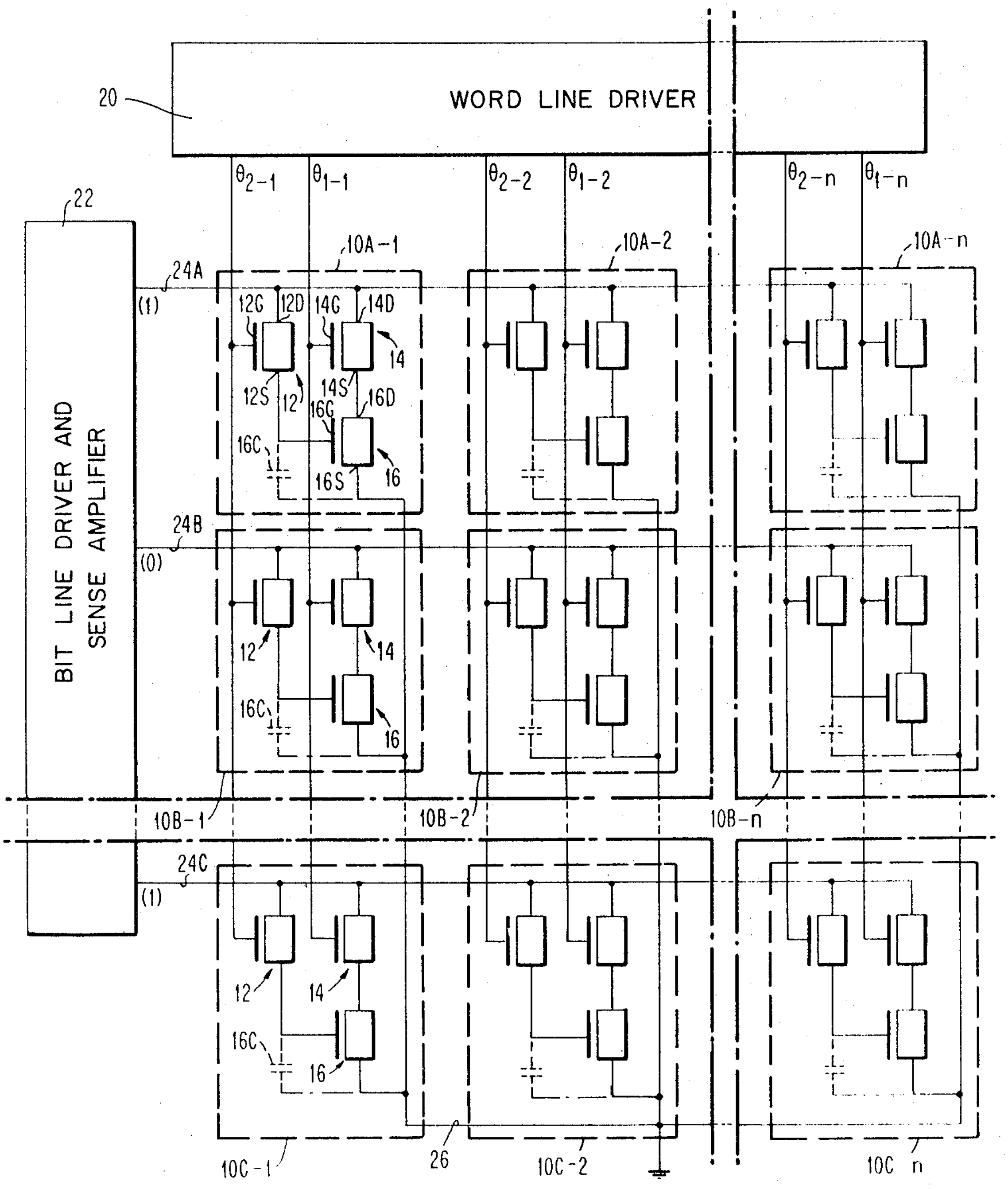
FIG. 1 is a schematic representation illustrating the electrical connections of a memory unit built in accordance with the principle of the present invention.

The memory unit shown in FIG. 1 is an $n \times n$ array of memory cells 10, each of which is formed by three field-effect transistors 12, 14 and 16. The preferred embodiment only discloses nine cells since this is all that is necessary to illustrate the principles of the invention. In actual practice, it is obvious that larger memories including many more cells are employed, but a disclosure of such a large embodiment though more related to actual use, would only serve to complicate the disclosure without adding to the teaching of the invention . Each of the three transistors within the cells 10 contains a gate electrode, 12G, 14G, and 16G; a drain region, 12D, 14D, and 16D; and a source region, 12S 14S, and 16S. Each of these transistors is an insulated-gate field-effect transistor. Transistors of this type are also known as MOS or metal-oxide-semiconductor transistors. All of the transistors are formed on a wafer or substrate of semiconductive material of a first type of semiconductivity, for example, a P substrate of silicon. The source and drain regions of these transistors are of a second type of semiconductivity such as N-type. These regions are formed by diffusing N-type impurities through the surfaces of the substrate to form two N+ regions which are highly doped with this N-type impurity. These two regions are connected by a channel at the surface of the substrate wafer which is located immediately beneath the gate electrode. In the disclosed embodiment, the transistors are of the N-channel-type, but it is obvious that the same effects could be achieved by forming a structure with a P-channel-type.

Effectively, back to back diodes are formed between the source and drain contact and the channel current is essentially zero for zero gate bias. If a positive voltage is applied to the gate, holes will be depleted from the surface and a further increase in bias will produce an accumulation of electrons at the surface. The surface channel goes from P-type, through intrinsic, to an inverted N-type layer, at which point ohmic conduction from source to drain begins. The transistors are of the enhancement type, by which it is meant that the channel between the source and drain regions is normally nonconducting and is rendered conductive by the application of a positive signal to the gate electrode. For conduction to occur there must be a voltage difference between the source and drain terminals and the gate voltage must exceed the voltage at the more negative of these terminals, the source terminal, by the threshold voltage for the transistor. It should be noted that the practice of the invention is not limited to enhancement mode NPN structures, since PNP field-effect devices can also be utilized. It is also noted that depletion mode devices in which the channel between the source and drain is normally conducting and is rendered nonconductive by gate signals can also be employed with appropriate changes in the voltages applied to the circuitry for controlling the memory array.

The operation of controlling the read or write cycles of the memory cells of FIG. 1 is controlled by word line drivers represented by block 20 and bit line drive and sense amplifiers represented by block 22. The word line driver 20 operates a plurality of 1 and 2 lines through a decoder network (not shown) which sequentially selects which column of cells is to be read or written into. The 1 and 2 lines control the read and the write cycle of each cell respectively. A plurality of bit sense lines 24 connect each of the cells at 12D and 14D to the sense amplifiers which are not on the integrated circuit chip.

The bit sense line will either present a signal level on line 24 during a write cycle, or sense a drop in signal level on line 24 during a read cycle. Since the memory has a common bit sense line, it must be operated on a cyclical basis. That is, during the cycle 2 information is stored in the appropriate cells of the memory array and during the 1 cycle, information is detected from those cells having information stored across the capacitance between gate to substrate.

Referring specifically to the memory cell 10A–1 shown in the upper left hand corner of FIG. 1, information is stored within the cell during the write cycle by presenting a 2–1 signal which is propagated along the line connecting the word line driver 20 to the gate electrode 12G. Normally, transistor 12 is in an off or nonconducting condition, but the application of a sufficient threshold voltage to electrode 12G renders the transistor conductive. That is, the potential appearing at terminal 12D will be conducted through the transistor to terminal 12S. Therefore, during 2–1 time, when transistor 12 is conducting, the bit drivers will send a signal level along line 24A if it is desired to store a bit of information at capacitance 16C of transistor 16. If a potential appears at line 24A during 2–1, the potential is made to appear at terminal 12S and accordingly will create a charge across the capacitance between gate 12G and source 16S. This charge is maintained across these terminals for a long period of time relevative to the switching time of the transistors, Thus, even though the charge tends to dissipate across the capacitance with the passage of time, the charge will be maintained for approximately 80 percent of the operation time of the memory unit. Thus, even though it is necessary to periodically regenerate the stored information, regeneration occupies only 10—20 percent of the memory operation.

After information has been stored at the capacitor 16C, the 2–1 line is returned back to zero thereby causing an infinite impedance across the 12 transistor. The charge is maintained across 16C so that during a read cycle which occurs at 1–1, the information stored in the form of a charge on the capacitor may be detected along the bit sense line 24A. During the read operation, a signal is presented on the 1–1 line by word line driver 20. This potential appears at gate electrode 14G of transistor 14. The appearance of this potential renders transistor 14 in a conductive state. During 1–1, it is desired to read the information stored at 16C by detecting a drop in a signal level which is presented on bit sense line 24A. Effectively, the bit line driver shown in block 22 would present a potential level on all bit sense lines 24, and if there is an information charge stored across capacitance 16C, a decrease in the signal level should be detected by the fact that the charge across the capacitance in conjunction with the switching on of transistor 14 ties lines 24 to ground. That is, if there is a charge across 16C, transistor 16 is in conducting state, Therefore, the ground potential which appears at terminal 16S is also presented at terminal 16D. Since the drain electrode 16D and the source electrode 14S are common, when the 1–1 line forces transistor 14 to conduct, terminal 14D is effectively tied to ground thereby causing the signal level on line 24A to decrease substantially so as to be detectable by the sense amplifiers found in 22.

If on other hand it is desired to write a zero bit of information into storage cell 10A–1, then during the 2–1 cycle, a zero potential would appear at line 24A which would be transmitted to terminal 16G and no charge would be stored across capacitor 16C. Then, during 1–1 cycle, when transistor 14 is made to conduct, no decrease in signal level will be detected by the sense amplifier 22 along line 24A.

In a similar manner as described for the read/write cycle of cell 10A–1, all of the cells shown in column 1 (10A–1, 10B–1, 10C–1) would be energized at a common 1–1 and 2–1 time. Furthermore, the memory would be operated in a cyclical fashion one word at a time. That is, 1–1 and 2–1 for column 1 would first be energized, then 1–2 and 2–2 of the second word for column 2 would be energized. This controlling of the operation of 1 and 2 may be performed by a series of decoder networks not shown. Similarly, the bit sense lines would have decoders to route the information to the appropriate registers and circuitry within the processing unit that is utilizing the memory.

Figure 2:
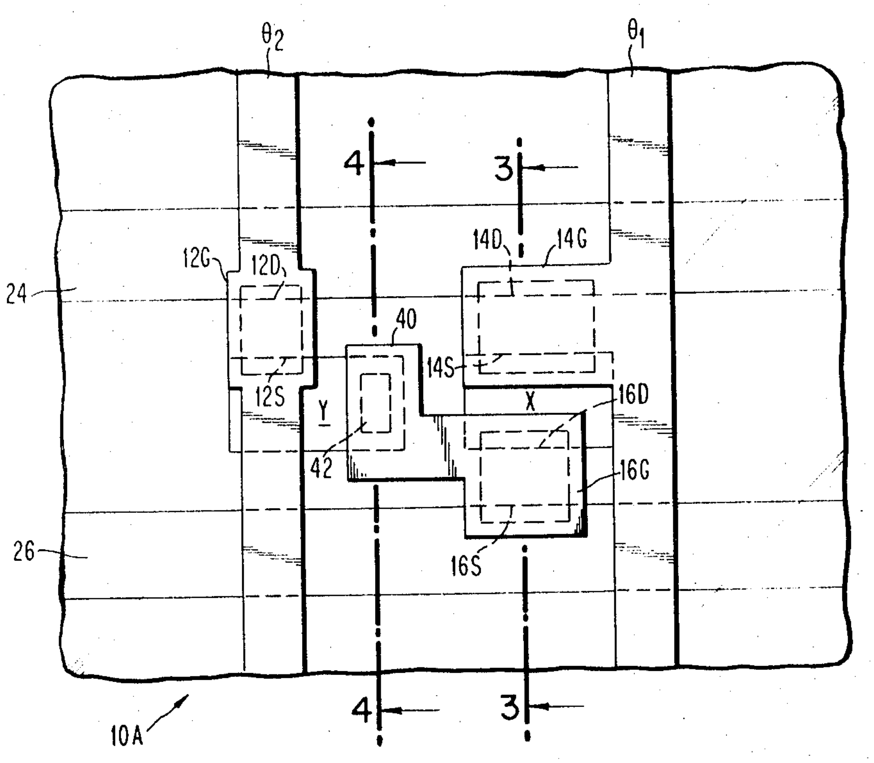
FIG. 2 is a top view of a memory cell for the circuit of FIG. 1 where the cell formed is an integrated circuit on a single substrate.
Figure 3:
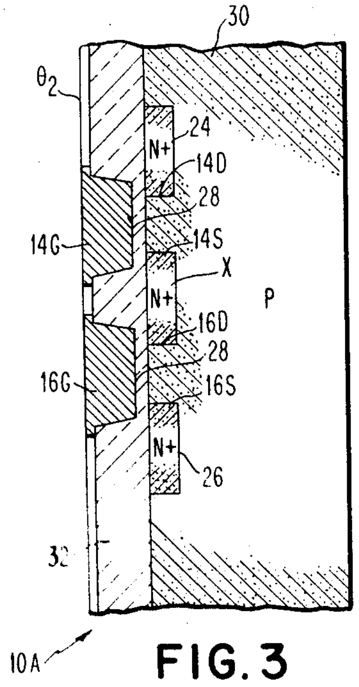
FIGS. 3 and 4 are cross-sectional views of the single cell structure of FIG. 2.
Figure 4:
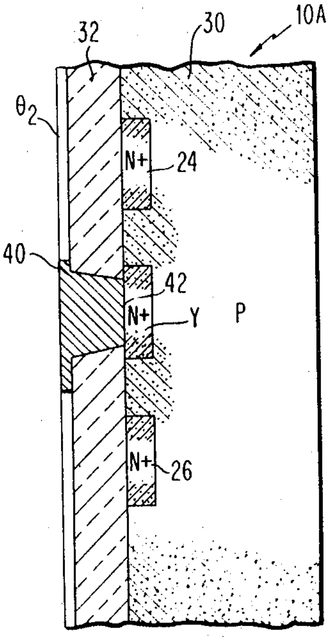

The entire memory array of the type shown in FIG. 1 in an electrical schematic form, may be fabricated as an integrated circuit on a single silicon substrate. A preferred embodiment of one cell in such s substrate is illustrated FIG. 2 in conjunction with FIGS. 3 and 4. FIG. 2 represents a top view of one cell in the integrated circuit. FIGS. 3 and 4 are cross-sectional views across two sections of the cell which are provided to better understand the fabrication of the integrated circuit.

As indicated, the substrate which forms the base material for the integrated circuit is a silicon body 30 having a first type of semiconductivity designated as P. Over this silicon body, the entire surface of the substrate is covered with a thick layer of silicon dioxide 32 except at those locales on the surface of the substrate where the cells are constructed. The source and drain regions for the cells (12D, 12S, 14D, 14S, 16D, and 16S) are formed by diffusing N-type impurities through the surface of the substrate to form the N+ regions which are highly doped with this N-type impurity. These regions of the field-effect transistors are formed from portions of the diffused bit sense line 24 and ground line 26 and diffused areas X and Y. The bit sense line 24 and the ground line 26 are diffused regions which run the entire length of the substrate. These lines 24 and 26 are made to form drain and source regions in the vicinity of gate electrodes and are designated as 12D, 14D, and 16S. After the diffused regions are formed within the substrate, a thin layer of silicon dioxide is formed over the entire surface of the substrate so as to completely cover all of the diffused regions and the silicon substrate. This oxide covering is an insulating material which will separate the gate regions from the drain and source regions. Over the insulating type material 32, aluminum lines are formed interconnecting the various cells on the integrated circuit. These lines are represented as 1 and 2 and are shown as extending over field-effect transistors 12 and 14 in the areas designated as 12G and 14G. It is seen from FIGS. 3 and 4 that the aluminum layers are tapered at the sides and overlie a small portion of the drain and source regions so as to form an N-channel between the source and drain. The interface at the bottom of the aluminum line with the oxide region shown as interface 28 is shown as dashed lines underneath the extending aluminum areas. The N-type channel is formed directly underneath this oxide region and allows conductivity between the source and the drain whenever a sufficient threshold potential appears at the metal gate electrode 12G, 14G, and 16G.

Also shown in FIG. 2, the aluminum section which forms gate 16G and is made to extend beyond the transistor region so as to provide an ohmic contact with the source region of transistor 12 designated as 12S. This ohmic contact is represented as an electrical connection between aluminum line 40 and N+diffusion region Y. Connection is made at the interface 42 by means of any well-known bonding technique. This ohmic connection is the only penetration of layers which is required in the cell structure and provides for a symmetrical and compact arrangement of the field-effect devices on the integrated circuit.

After the metallic layers are formed on the substrate. Further layers of silicon dioxide insulating material material are deposited over the entire substrate surface and then, removed in those areas where the oxide overlies the aluminum lines.

It is recognized by those skilled in the art that while the preferred embodiment has been disclosed as being formed with a P Substrate material and N+ diffusion region. That the same functional objectives may be obtained by using an N substrate with P+ diffusion regions. It is also recognized that the entire substrate on which the memory is formed is normally tied to a reference potential. This biasing of the substrate is not shown since it is well known in the art to do so.

OPERATION OF THE INVENTION

For the purposes of illustration, let us assume that it is desired to store a binary word 101 in the word consisting of the cells arranged in column 1, that is, cells 10A–1, 10B–1, and 10C–1. Initially, the word line driver would present a positive signal level of 1 volt on the 2–1 line so as to apply this potential at all of the gates 12G of word 1. This threshold potential renders transistors 12 conductive. Concurrently with the presentation of 2–1, lines 24 which are connected to bit line driver 22 would transmit the signal levels representing the binary word to the cells. That is, a potential level of 9 volts would be presented on first the line 24A where the binary 1 is to be stored, and a ground potential would appear at the second line 24B where a 0 is to be stored and similarly, a +9 voltage would appear to represent a binary 1 along the third line 24C. Since the 2–1 potential has rendered all of the field-effect transistors 12 in cells 10A–1, 10B–1 and 10C–1 conductive, the potential appearing at lines 24 also appears across the capacitors 16C thereby storing a charge representative of the binary data across the gate to substrate capacitance of the transistors 16. The required time to charge up the capacitors is very small and comprises the entire write cycle time during which the 2–1 signal is present. This time in actual practice would be in the range of 50 nanoseconds. After the information is stored in the cells 10A–1, 10B–1 and 10C–1, the charge is maintained across the capacitance for a relatively long period of time as compared to the read/write time before sufficient degeneration of the charge requires a rewriting of the information.

When it is desired to read out the information stored in the respective cells, a 1–1 signal would be applied to transistors 14 by presenting a potential at all of the gates 14G in cells 10A–1, 10B–1, and 10C–1. Concurrent with the presentation of the 1–1 signal, lines 24 would be driven to a positive potential. This potential appears on all of lines 24. However, only cells 10A–1, 10B–1, and 10C–1 are operative since the 1 lines for the remaining cells are at ground potential thereby effectively isolating all of the remaining cells from the bit sense lines. This isolation reduces errors in the read cycle. During 1–1 time, at those cells 10A–1 and 10C–1 where a binary 1 information is represented by a charge across capacitor 16C, field effect transistors 16 are rendered conductive. Thus, lines 24A and 24C at cells 10A–1 and 10C–1 are effectively tied to ground. This causes a decrease in the signal level that appears on the lines 24A and 24C that interconnect with cells 10A–1 and 10C–1. This decrease in signal level is detected by sense amplifiers in block 22 which would transfer the information to further stages of a processing unit through a decoder network (not shown). Cell 10B–1, which has a zero charge across capacitor 16C would cause transistor 16 to remain open thereby causing no effect on the signal level of line 24B.

When it is desired to recharge all of the storage capacitors in the integrated circuit memory unit, a read cycle is taken and the information is then rewritten back into the corresponding cells in the memory unit. Rewriting of the information is usually necessary approximately every 200 microseconds. Since in a 200 word array, read/write operations can be carried out in a 100 nanosecond, all All of the words in a memory may be regenerated in a period of 20 microseconds. This allows operation of a memory for 180 microseconds (1800 read/write operations) before the next regeneration cycle. By interspersing the regeneration with the read/write cycles it is possible to allow a 90 percent utilization of the read/write cycle in the use of the memory and only 10 percent of the total memory time would be required for regeneration.

While the invention has been particularly shown and described with reference to the preferred embodiment thereof, it will be understood by those skilled in the art that various changes in form and details may be made therein without departing from the spirit and scope of the invention.

What I claim is;

1. An integrated circuit storage device having an array of memory cells capable of accepting, maintaining and outputting digital information wherein each cell comprises:

a first insulated-gate field-effect transistor having a first source, a first drain and a first gate region capable of storing digital information by maintaining a charge across the capacitance between said first gate region and said first source region which conditions said first transistor to a conducting state between said first drain and first source regions;

a second insulated gate field-effect transistor having a second source, a second drain and a second gate region;

a third insulated-gate field-effect transistor having a third source, a third drain and a third gate region;

a bit sense line formed from said second and third drain regions for inputting or outputting digital information to said cells;

a ground line connected to said first source region;

said cell further comprising an ohmic connection between said first gate region and said third source region;

said first drain and second source regions being common as to form a connection between said first and second transistors;

a first control means connected to said second gate region for sensing the state of said first transistor;

a second control means connected to said third gate region for applying a potential signal level to said first transistor;

whereby a signal level appearing on the bit sense line may be stored at the capacitance existing between the first gate and the first source by said second control means and the condition of said capacitance being detected by its effect on a signal level appearing on said bit sense line.

2. The integrated circuit as defined in claim 1 wherein said first and second control means are signal lines connected to said second and third gate regions respectively so as to apply a potential signal capable of switching said second and third insulated gate field effect transistors to a conducting state.

3. The integrated circuit as defined in claim 2 wherein a portion of said bit sense line is a diffused semiconductive material that forms said second and third drain regions.

4. The integrated circuit as defined in claim 3 wherein a portion of said ground line is a diffused semiconductive material which forms said first source region.

5. The integrated circuit as defined in claim 4 wherein the ohmic connection in said cell forms an electrical contact between said first gate region and said third source region;

said first gate region being a metal and said third source region being a diffused semiconductive material.

6. The integrated circuit as defined in claim 5 wherein said first, second and third gate regions are insulated from said first, second and third source and drain regions by means of a thin insulating oxide layer.

7. A nondestructive read storage device capable of maintaining a signal representative of stored digital information comprising:

a body of semiconductive material of a first type of semiconductivity;

a plurality of cells arranged in a two-dimensional array within said body of semiconductive material;

all of the cells in a row of a first dimension being commonly joined by a first and second diffused regions of semiconductive material of a second type of semiconductivity;

a portion of said first diffused region forming a ground line and said second diffused region forming a bit sense line;

a third and fourth diffused regions of semiconductive material of a second type of semiconductivity extending into a portion of said body of semiconductive material;

a first region of insulating material completely overlying said diffused regions;

a first and second control line formed by a metal layer overlying said insulating region so as to form three insulated-gate field effect transistors within each cell;

said transistors being formed so as to have an ohmic connection within the cell between said fourth diffused region and a metal gate region between said first and second control lines;

whereby said three insulated-gate field-effect transistors in each cell may accept, maintain and output electrical signal information via said second diffused region.

PO-1050
(5/69)

UNITED STATES PATENT OFFICE
CERTIFICATE OF CORRECTION

Patent No. 3,585,613 Dated June 15, 1971

Inventor(s) Thomas L. Palfi

It is certified that error appears in the above-identified patent and that said Letters Patent are hereby corrected as shown below:

In the ABSTRACT: line 7 " 1 and 2" should read --$\phi$1 and $\phi$2--.

| | | |
|---|---|---|
| Column 1, | line 16 | "EGFET'S" should read --IGFET's--. |
| Column 2, | line 70 | " 1 and 2" should read --$\phi$1 and $\phi$2--. |
| Column 3, | line 5 | Should read --$\phi$2--. |
| | line 6 | Should read --$\phi$1--. |
| | line 11 | Should read --$\phi$2-1--. |
| | line 18 | Should read --$\phi$2-1--. |
| | line 22 | Should read --$\phi$2-1--. |
| | line 34 | Should read --$\phi$2-1--. |
| | line 36 | Should read --$\phi$1-1--. |
| | line 39 | Should read --$\phi$1-1--. |
| | line 42 | Should read --$\phi$1-1--. |
| | line 54 | Should read - $\phi$1-1--. |
| | line 60 | Should read --$\phi$2-1--. |
| | line 63 | Should read --$\phi$1-1--. |
| | line 68 | Should read --$\phi$1-1--. |
| | line 70 | Should read --$\phi$2-1--. |
| | line 71 | Should read --$\phi$1-1-- and --$\phi$2-1--. |
| | line 73 | Should read --$\phi$1-2-- and --$\phi$2-2--. |
| | line 75 | Should read --$\phi$1-- and --$\phi$2--. |
| Column 4, | line 38 | Should read --$\phi$1-- and --$\phi$2--. |
| Column 5, | Line 5 | Should read --$\phi$2-1--. |
| Column 5, | line 8 | Should read --$\phi$2-1--. |
| | line 15 | Should read --$\phi$2-1--. |
| | line 22 | Should read --$\phi$2-1--. |
| | line 30 | Should read --$\phi$1-1--. |
| | line 33 | Should read $\phi$1-1--. |
| | line 39 | Should read --$\phi$1-1--. |

Signed and sealed this 16th day of May 1972.

(SEAL)
Attest:

EDWARD M.FLETCHER,JR.
Attesting Officer

ROBERT GOTTSCHALK
Commissioner of Patents